Dec. 12, 1967   P. W. MOUCK   3,357,094
BLIND FASTENER
Filed Dec. 4, 1964

INVENTOR.
PAUL W. MOUCK
BY Williams, David,
Hoffmann & Yount
ATTORNEYS

United States Patent Office 3,357,094
Patented Dec. 12, 1967

3,357,094
BLIND FASTENER
Paul W. Mouck, Euclid, Ohio, assignor to The National Screw & Manufacturing Company, Cleveland, Ohio, a corporation of Ohio
Filed Dec. 4, 1964, Ser. No. 416,060
11 Claims. (Cl. 29—509)

The present invention relates to the art of blind fasteners of the screw or bolt type, that is blind fasteners adapted to be set or driven by relative rotation between two parts of the fastener having threaded engagement with one another.

One of the principal objects of the invention is the provision of a novel and improved blind fastener of the screw or bolt type comprising a screw part including a shank portion at least a section of which is threaded, a head at one end of the shank portion and a threaded projection of noncircular cross-sectional shape at the other end forming a driving connection, and a nut part devoid of any driving connection threaded onto the threaded section of the shank portion of the screw part with at least a part of the projection of the screw part forming the driving connection located at an accessible side of the nut part.

A more specific object of the invention is the provision of a novel and improved blind fastener of the screw or bolt type comprising a screw part including a shank portion at least a section of which is threaded, a head at one end of the shank portion and a threaded projection of noncircular cross-sectional shape at the other end forming a driving connection, means including a section of less strength than that of the minimum cross-sectional area of the shank portion connecting the driving projection to the shank portion, and a nut part devoid of any driving connection threaded onto the threaded section of the shank portion of the screw part with at least a part of the projection of the screw part forming the driving connection located at an accessible side of the nut part and accessible to a driver, that is, engageable by a driving tool either hand or power actuated.

Another object of the invention is the provision of a novel and improved tool for setting or driving a blind fastener comprising a screw part having a driving connection located at an accessible side of a nut part, which tool comprises a housing having a forwardly projecting portion or member the end of which is preferably devoid of driving connections and has an aperture therein provided with internal threads engageable with a threaded portion of the screw part of the fastener, a driving member rotatable within the housing engageable with the driving connection of the screw part of the fastener for rotating the same, and means for producing relative rotation between the forwardly projecting portion or member of the housing and the driving member, preferably by rotating the driving member.

Another object of the invention is the provision of a novel and improved tool for setting or driving a blind fastener comprising a screw part having a threaded driving connection located at an accessible side of a nut part, which tool comprises a housing, a collet chuck jam assembly projecting from and spring biased outwardly from said housing the projecting end of which assembly is internally threaded for engagement with the threads of the driving connection of the screw part and is engageable with the accessible end of the nut part of the fastener, a driving member rotatable within the housing engageable with the driving connections of the screw part of the fastener for rotating the same, and means for rotating the driving member which means is preferably power actuated.

Another of the principal objects of the invention is the provision of a novel and improved method of driving a blind fastener comprising a screw part having a projecting threaded driving connection located at an accessible side of a nut part which method comprises engaging both the threads of the driving connection of the screw and nut parts of the fastener with a nonrotatable member and rotating the screw part of the fastener.

The invention resides in certain constructions and combinations and arrangements of parts and steps of operation, etc., and further objects and advantages will be apparent to those skilled in the art to which the invention relates from the following description of the preferred embodiments and operations described with reference to the accompanying drawings forming a part of this specification and in which.

Figure 2:
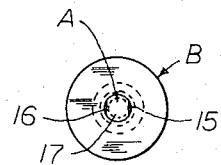
FIG. 2 is an end elevational view of the fastener shown in FIG. 1 looking from the left.
Figure 1:
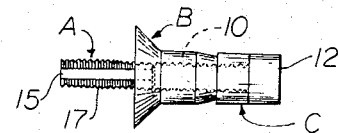
FIG. 1 is a side elevational view of a fastener constructed in accordance with the present invention.

The invention is susceptible of embodiment in blind fasteners and tools, etc. of various construction and is herein illustrated as employed with and/or embodied in a blind fastener similar to that illustrated in United States patents to Hopkins, No. 2,776,681, Hodell No. 2,974,558, etc., including the blind fasteners disclosed in Hopkins copending United States application, Ser. No. 831,589 filed Aug. 4, 1959. It is, however, to be understood that the invention is susceptible of embodiment in and/or employed with other blind fasteners.

Referring to the drawings, the fastener shown comprises a headed screw or bolt member designated generally by the reference character A including a threaded shank 10 having a nut member B threaded thereon and a tubular sleeve member C slidable on the shank 10 of the screw between the head 12 of the screw and the nut member B. The screw A constitutes the internal or blind part of the fastener, the nut B the external or nonblind part of the fastener and the sleeve C the blind head part of the fastener. The end of the nut B adjacent to the sleeve C is conical and expands the end of the sleeve adjacent thereto into a blind head at the inaccessible side of a structure with which the fastener is used as the head 12 of the screw A is drawn or advanced toward the nut B upon rotation of the screw A in the proper direction while the nut B is prevented from rotating.

Opposite sides 15 and 16 of the end 17 of the shank 10 of the screw or bolt member A which projects beyond the nut member B when the fastener is driven are flat and constitute a driving connecting for rotating the screw A by a suitable tool, hand or power, such as the tool shown in the drawing and designated generally by the reference character T. The driving connection or part 17 of the screw A is connected to the shank 10 proper by a section of less cross-sectional area and less strength than that of the minimum cross-sectional area of the shank section so that it will break off when the driving torque reaches a predetermined amount. In the embodiment shown, this section of less strength is provided by a groove 18 at the end of the shank proper so located that it comes substantially flush with the outer face of the nut B when the fastener is set or driven. The nut B, as shown, is provided with a countersunk-type head devoid of any driving slots or other driving connections and is adapted to set in a suitable countersink in the structures with which it is used so that it will become flush with the external surface thereof.

The tool T comprises a multi-part housing assembly 20 having a tubular-like forward nose portion 21 and a pistol-type grip 22 at the rear or opposite end for facilitating handling and manipulation of the tool. The housing assembly includes an air operated rotary-type motor (not shown) operatively connected to and adapted to drive a driving element 23 rotatably supported in the housing assembly 20 concentric with the nose portion 21.

Figure 3:
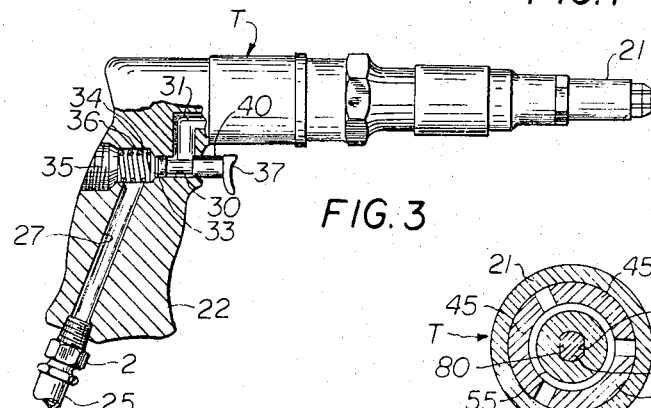
FIG. 3 is a side elevational view with portions in section showing a tool constructed in accordance with the present invention.
Figure 5:
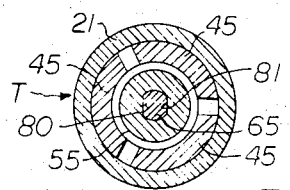
FIG. 5 is a sectional view approximately on the line 5—5 of FIG. 4.
Figure 4:
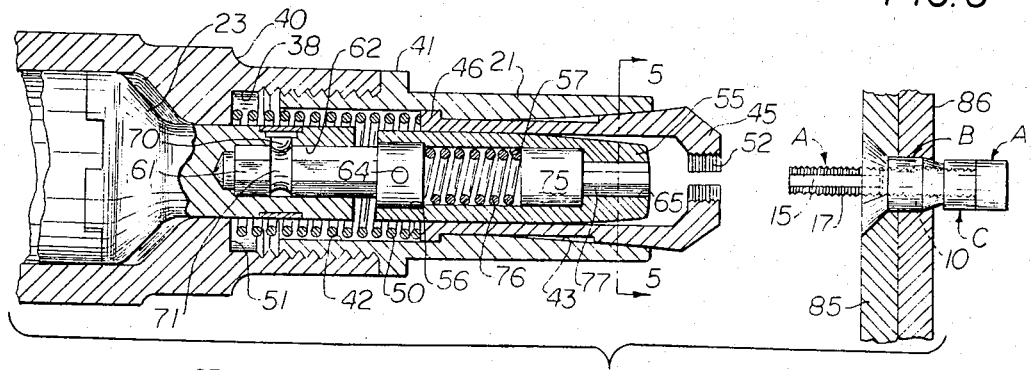
FIG. 4 is an enlarged fragmentary sectional view with portions in elevation of the nose portion of the tool shown in FIG. 3 positioned for engagement with a blind fastener shown assembled with two members to be secured together thereby.
Figure 6:
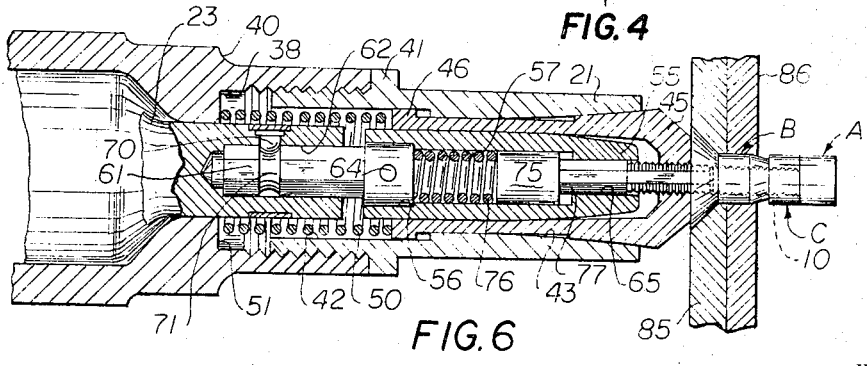
FIG. 6 is a view similar to FIG. 4 but showing the tool in driving engagement with the fastener.

Fluid under press, in the present instance, air, for operating the tool is supplied through a flexible hose or conduit 25 connected by a fitting 26 to a conduit 27 in the pistol-type handle grip 22 in such a manner that the flexible hose 25 is continuously in communication with the conduit 27 in the grip 22. The conduit 27 terminates in a transverse bore 30 in the grip 22, the front or right-hand end of which, as viewed in FIG. 3, communicates with a second conduit 31 leading to the motor. The flow of fluid under pressure to the motor is controlled by a valve 33 adapted to seat upon a shoulder to the right of the conduit 27 formed by a counterbore 34 in the left-hand end of the bore 30. The left-hand end of the counterbore 34 is closed by a plug 35 and the valve 33 is biased to a closed position by a compression spring 36 located in the counterbore 34 and interposed between the valve 33 and the plug 35. The valve 33 is adapted for manual operation and includes a trigger-type finger grip 37 connected to the projecting or right-hand end of the valve stem 40 slidably supported in the bore 30.

The left-hand end of the nose portion 21 of the housing assembly 20 is threaded for detachable engagement in a threaded counterbore 38 in the adjacent end of the adjoining member 40 of the housing assembly. An external flange 41 on the member 21 limits the amount that the member 21 can be screwed into the threaded end of the member 40 and when the flange 41 is tightly engaged with the right-hand end of the member 40 the two parts are fixedly but detachably secured together. The left-hand end of the member 21 is counterbored as at 42 and the interior of the right-hand end is tapered as at 43 such that it decreases in diameter toward the left or rear of the tool. The member 21 houses a collet chuck comprising a plurality of radially movable elements or jaws 45, in the present instance three. The right-hand end of the collet chuck, or more specifically the right-hand ends of the jaws 45 project beyond the open right-hand end of the member 21 and at least a portion of the external circumference of the jaws is tapered to conform with the tapered bore 43 of the member 21. The left-hand ends of the chuck are provided with external flanges 46 which engage with an interior shoulder 47 in the member 21 at the right-hand end of the counterbore 42 to limit movement of the chuck toward the right. The jaws 45 are biased toward the right, that is, in a direction to project from the member 21 by a coil spring 50 interposed between the left-hand ends of the jaws 45 and a shoulder 51 formed by the threaded counterbore 38 in the right-hand end of the member 40 and within which the member 21 is secured. The right-hand or projecting ends of the jaws have inwardly projecting internally threaded flanges 52 adapted when the jaw assembly is contracted upon movement of the jaw toward the left to loosely engage the threaded shank of a fastener of the type shown in the drawings or the driving connections thereof.

The tool T also includes a member 55 rotatably supported within the housing assembly 20 and located or positioned within the member 21. In the embodiment shown, the member 55 is tubular and has two counterbores 56 and 57 in its left-hand end and is adapted to be detachably connected to the right-hand end of the driving member 23 of the tool T by a member 61, the right-hand end of which is hexagonal for detachable engagement in a hexagonal aperture or socket 62 in the right-hand end of the member 23. The right-hand end of the member 61 is fixedly secured as by a pin 64 in the larger of the two counterbores in the left-hand end of the member 55. The right-hand end 65 of the aperture in the member 55 is formed to engage the driving connection of the fastener with which the tool is intended to be used. The member 61 is detachably secured in the aperture 62 by a spring pressed detent 70 carried by the member 23 and engageable in a groove 71 in the member 61.

In the embodiment shown, a member 75 is slidably supported in the smaller counterbore 57 of the two counterbores in the left-hand end of the member 55 and is biased toward the right by a spring 76 interposed between the left-hand end thereof and the right-hand side or end of the member 61. The member 75 is provided with a portion 77 extending into the right-hand aperture 65 in the member 55 and normally projecting at least to the right-hand end thereof.

The aperture 65 in the right-hand end of the member 55 is cylindrical except for two opposite sides 80, 81 which are flat. The diameter of the cylindrical part of the aperture 65 is equal to the maximum thread diameter of the driving connection 17 of the screw A with which it is intended to be used, and the flat sides 80 and 81 are adapted to engage the flat sides 15 and 16 of the driving connection so that upon rotation of the member 55 the screw A of the fastener will be rotated. The cross-sectional shape of the projection 77 of the member 75, which member is slidably supported in the part 55 of the driving tool, conforms to the cross-sectional shape of the aperture 65.

The operation of the driving tool T and the driving of the fastener illustrated in the drawings is as follows: the fastener is first inserted in aligned apertures in the structural members to be secured together thereby, such as, the two plate-like members 85, 86 which members it is assumed are accessible only from the left-hand side. In the present instance the accessible end of the apertures in the members 85, 86 into which the fastener is inserted is counterbored to receive the countersunk head of the nut member B of the fastener. The blind end of the fastener, that is, the end at which the head 12 of the screw member is located, is inserted through the apertures until the countersunk head of the nut member engages the accessible member 85.

To drive the fastener the tool T is inserted over the projecting end or driving connection 17 of the screw part of the fastener until the forward or right-hand ends of the jaws 45 engage the exterior face of the head of the nut part of the fastener. Continued efforts on the part of the operator to move the tool toward the structures in which the fastener is being driven results in the nose member 21 of the tool being pushed over the jaws 45 to cause the same to contract and engage the threaded projection 17 of the screw part of the fastener in the internally threaded flanges at the right-hand end of the jaws 45. The relative parts are so constructed that when the jaws 45 tightly engage the threaded portion of the driving connection 17 the left-hand projecting end of the driving connection 17 engages within the aperture 65 in the member 55. This projection of the end of the driving connection 17 into the aperture 65 of the member 55 moves the projection 77 of the member 75 toward the left against the action of the spring 76. The engagement between the projecting end of the driving connection 17 of the fastener and the forward or right-hand end of the member 55 is such that the screw part of the fastener will be rotated upon rotation of the member 55 upon operation of the tool by the operator.

If the projecting end of the driving connection 17 of the fastener abuts the right-hand end of the member 55 because it is not properly aligned with the aperture 65 when the operator places the end of the tool over the driving connection and moves the tool toward the fastener, the parts will align during the initial rotation of the member 55 when power is applied to the tool and immediately upon their alignment the driving connection 17 will engage in the aperture 65 of the member 55 and the jaws 45 will move into engagement with the external face of the nut member if they are not already engaged therewith. As previously mentioned, continued movement of the tool toward the right subsequent to the engagement of the ends of the jaws 45 with the external face of the head of the nut B results in the jaws being contracted relative to one another and the threaded projection of the screw A engaged in the threads of the jaws.

Rotation of the screw A of the fastener by the member 55 through the driving connection 17 will result in the screw part of the fastener being drawn into the jaws 45 by virtue of the threaded engagement between the external threads on the driving connection 17 of the fastener and the threads on the inwardly projecting flanges 52 of the jaws 45. The rotation of the screw A within the nut B will also cause the head 12 of the screw A to be drawn toward the nut B thereby causing the left-hand end of the sleeve C to be drawn over the tapered nose of the nut and thereby expanded into a blind head. The engagement between the right-hand ends of the jaws 45 and the accessible face of the head of the nut B prevents rotation of the nut B relative to the screw A. If, for any reason, the internal threads of the jaws 45 engage the driving connection 17 before they are firmly seated against the external face of the head of the nut B of the fastener, this is immaterial because upon rotation of the driving connection 17 of the fastener by the part 55, the entire fastener will be rotated causing the jaws 45 to advance over the driving connection 17 and into engagement with the external face of the head of the nut B.

From the foregoing it will be apparent that no positive driving connection is necessary between the jaws 45 of the tool T and the nut B of the fastener. When the right-hand ends of the jaws 45 are firmly seated against the accessible face of the head of the nut B, they operate as a unit with the nut and the screw A rotatable within both the jaws 45 of the tool and the nut B. One of the many advantages of the present tool is the fact that it can be employed in the driving of commercial fasteners generally similar to the fastener shown in the drawings but having driving slots or other apertures in the accessible face of the head of the nut member and/or having any type of projecting head so long as the end of the driver can make firm contact against the head. The driving tool shown is illustrative of the tool the present invention and can be modified in various ways. The essential features of the fastener are cooperating or interengaging helical cam surfaces or means on the blind and nonblind members, a contact surface for the tool on the head of the nonblind member and an accessible driving connection on the blind member and the essential features of the tool are means for rotating the blind member while the end of the tool abuts a suitable surface of the nonblind member of the fastener and engages the cam surface of the blind member.

While the preferred fastener, tool and method of the present invention have been shown and described in considerable detail, the invention is not limited to the embodiments shown and described and it is the intention to hereby cover all adaptations, modifications and uses thereof which come within the practice of those skilled in the art to which the invention relates and the scope of the appended claims.

What I claim is:

1. The method of driving a blind fastener comprising an internal or blind member having external threads and a driving connection at the accessible or nonblind side of an external or nonblind member threaded thereon and comprising a head having an outer abutment surface engageable with the accessible side of a structure with which the fastener is employed, which method comprises positioning the fastener in a preformed hole in a structure, threadedly engaging threads of the internal or blind member and frictionally engaging the accessible or nonblind side of the head of the external or nonblind member with a non-rotatable member, and rotating the internal or blind member while the external or nonblind member is held stationary by said frictional engagement to move a part of the fastener into engagement with the inaccessible or blind side of the structure.

2. The method of driving a blind fastener comprising an internal or blind member having external threads and a driving connection at the accessible or nonblind side of an external or nonblind member threaded thereon and comprising a countersunk head having an outer abutment surface for engagement in an enlarged end of an aperture opening into the accessible side of a structure with which the fastener is employed, which method comprises positioning the fastener in a preformed hole in a structure, threadedly engaging threads of the internal or blind member and frictionally engaging the accessible or nonblind side of the head of the external or nonblind member with a non-rotatable member, and rotating the internal or blind member while the external or nonblind member is held stationary by said frictional engagement to move a part of the fastener into engagement with the inaccessible or blind side of the structure.

3. A method of setting a blind fastener including a nut part threaded onto a screw part having a threaded portion provided with a driving connection and extending to the accessible side of said nut part, the method comprising the steps of positioning the fastener in a preformed blind hole, threadedly engaging a portion of the threads of the screw part at the accessible side of the nut part with a non-rotatable first tool member and frictionally engaging a generally planar surface of said nut part with a generally planar surface of the first tool member, engaging said driving connection of said screw part with a driving connection of a second tool member, rotating said second tool member to rotate said screw part of said fastener relative to said nut part while holding said nut part against rotation with said screw part by said frictional engagement to move a part of the fastener into engagement with the inaccessible or blind side of the structure.

4. In a blind fastener for use in a structure having an inaccessible or blind side and an aperture therethrough, an internal or blind part comprising a generally cylindrical shank section and a first head formed integral with said shank section at the inaccessible or blind end thereof, said head having a diameter about 1.5 times the diameter of said shank section and adapted to be projected through the aperture in the structure to a position at the inaccessible or blind side of the structure and adapted to move a part of the fastener into engagement with the inaccessible or blind side of the structure, said shank section having at least a portion thereof externally threaded and a portion thereof of noncircular cross-sectional shape, said latter portion being at the external or nonblind end of said shank section and forming a driving connection, and a tubular external or nonblind part threaded onto the threaded portion of said shank section of said internal or blind part with at least a portion of said driving connection at the accessible side of said external or nonblind part, said external or nonblind part comprising a cylindrical section and a second head formed integral with said cylindrical section at the external or nonblind end thereof having its side adjacent to said tubular section engageable with the accessible or nonblind side of the structure with which the fastener is employed and its opposite side continuous, said second head being of uniform cross section in all planes through the axis of the threaded opening therethrough, said fastener being adapted to be set by rotation of said blind part while said nonblind part is held stationary by a tool having a planar surface abutting said opposite side of said second head whereby said second head is devoid of a driving connection before and after setting.

5. In a blind fastener for use in a structure having an inaccessible or blind side having an aperture therethrough, an internal or blind part comprising a generally cylindrical shank section and a head formed integral with said shank section at the inaccessible or blind end thereof adapted to be projected through the apertures in the structure to a position at the inaccessible or blind side of the structure and adapted to move a part of the fastener into engagement with the inaccessible or blind side of the structure, said shank section having at least a portion thereof externally threaded and a portion thereof of noncircular cross-sectional shape, said latter portion being at the external or nonblind end of said shank section and forming a driving connection, and a tubular external or nonblind part threaded onto the threaded portion of said shank section of said internal blind part with at least a portion of said driving connection at the accessible side of said external or nonblind part, said external or nonblind part comprising a cylindrical section and a circular head formed integral with said tubular section at the external or nonblind end thereof having its side adjacent to said tubular section engageable with the accessible or nonblind side of the structure with which the fastener is employed and its opposite side continuous, said fastener being adapted to be set by rotation of said blind part while said nonblind part is held stationary by a tool having a planar surface abutting said opposite side of said circular head whereby said circular head is devoid of a driving connection before and after setting.

6. In a blind fastener for use in a structure having an inaccessible or blind side and an aperture therethrough, an internal or blind part comprising a generally cylindrical shank section and a head formed integral with said shank section at the inaccessible or blind end thereof, said head having a diameter about 1.5 times the diameter of said shank section and adapted to be projected through the aperture in the structure to a position at the inaccessible or blind side of the structure and adapted to move a part of the fastener into engagement with the inaccessible or blind side of the structure, said shank section having at least a portion thereof externally threaded and a portion thereof of noncircular cross-sectional shape, said latter portion being at the external or nonblind end of said shank section and forming a driving connection, and a tubular external or nonblind part threaded onto the threaded portion of said shank section of said internal or blind part with at least a portion of said driving connection of said internal or blind part being located at the accessible side of said external or nonblind part, said external or nonblind part comprising an internally threaded cylindrical section and a countersunk head formed integral with said cylindrical section at the external or nonblind end thereof having its side adjacent to said tubular section engageable with a countersink in the accessible or nonblind side of the structure with which the fastener is employed and its opposite side continuous, said fastener being adapted to be set by rotation of said blind part while said nonblind part is held stationary by a tool having a planar surface abutting said opposite side of said countersunk head whereby the nonbearing external face of said countersunk head is devoid of a driving connection before and after setting.

7. In a blind fastener for use in a structure having an inaccessible or blind side having an aperture therethrough, an internal or blind part comprising a generally cylindrical shank section and a first head formed integral with said shank section at the inaccessible or blind end thereof, said head having a diameter about 1.5 times the diameter of said shank section and adapted to be projected through the aperture in the structure to a position at the inaccessible or blind side of the structure and adapted to move a part of the fastener into engagement with the inaccessible or blind side of the structure, said shank section having at least a portion thereof externally threaded and a portion thereof of noncircular cross-sectional shape forming a driving projection at the external or nonblind end of said shank section, said shank section having a portion intermediate its ends of less strength than the strength of the remainder of said shank section, and an external or nonblind tubular part threaded onto the threaded portion of said shank section of said internal or blind part with at least a portion of said driving projection of said internal or blind part at the accessible side of said external or nonblind part, said external or nonblind part comprising a cylindrical section and a second head formed integral with said cylindrical section at the external or nonblind end thereof having its side adjacent to said tubular section engageable with the accessible or nonblind side of the structure with which the fastener is employed and its opposite side continuous, said fastener being adapted to be set by rotation of said blind part while said nonblind part is held stationary by a tool having a planar surface abutting said opposite side of said circular head, said second head being of uniform cross section in all planes through the axis of the threaded opening therethrough whereby said second head is devoid of a driving connection before and after setting.

8. In a blind fastener for use in a structure having an inaccessible or blind side and an aperture therethrough, an internal or blind part comprising a generally cylindrical shank section and a head formed integral with said shank section at the inaccessible or blind end thereof, said head having a diameter about 1.5 times the diameter of said shank section and adapted to be projected through the aperture in the structure to a position at the inaccessible or blind side of the structure and adapted to move a part of the fastener into engagement with the inaccessible or blind side of the structure, said shank section having at least a portion thereof externally threaded and a portion thereof of noncircular cross-sectional shape at the external or nonblind end of said shank section forming a driving connection, means including a section of less strength than the strength of the minimum cross-sectional area of said shank section connecting said driving connection to said shank section, and an external or nonblind tubular part threaded onto the threaded portion of said shank section of said internal or blind part with at least a portion of said driving connection of said internal or blind part located at the accessible side of said external or nonblind part, said external or nonblind part comprising a cylindrical section and a countersunk head formed integral with said cylindrical section at the external or nonblind end thereof having its side adjacent to said tubular section engageable with a countersink at the accessible or nonblind side of the structure with which the fastener is employed and its opposite side continuous, said fastener being adapted to be set by rotation of said blind part while said nonblind part is held stationary by a tool having a planar surface abutting said opposite side of said countersunk head whereby the nonbearing or external face of said countersunk head is planar and devoid of a driving connection before and after setting.

9. In a tool for setting or driving a blind fastener comprising an externally threaded screw part having a driving connection on its circumference and located at an accessible side of a nut part threaded on said screw part, a housing having a forwardly extending part the end of which is engageable with the accessible end of the nut part during driving of the fastener and has an aperture a portion of which is provided with internal threads engageable with a threaded portion of the screw part of the fastener and through which internally threaded portion the screw part of the fastener is adapted to project; a driving member rotatable within said housing and having an aperture therein adapted to receive the end of the screw part of the fastener projecting through said internally threaded portion of said aperture in said forwardly extending part of said housing and engageable with the driving connection on the screw part of the fastener for rotating the same; and power means for rotating the driving member relative to said housing.

10. In a tool for setting or driving a blind fastener comprising a screw part having an accessible driving connection located at an accessible end of a nut part threadedly assembled therewith, a housing having a forwardly extending tubular part provided with a rearwardly converging frusto-conical surface, collet-type chuck jaw means slidably supported in said tubular part of said housing for movement axially therein and having jaw elements movable radially relative to each other extending axially beyond the forward end of said housing, said jaw elements having their forward ends devoid of driving connections and engageable with the accessible end of the nut part of the fastener, means spring biasing said jaw elements in a forward direction, means on said jaw elements cooperating with said frusto-conical surface effecting radial contraction of said jaw elements upon rearward movement of said jaw elements, internal threads on said jaw elements adjacent to their forward ends and engageable with the threaded portion of the screw part of the fastener, a driving member rotatable within said housing engageable with the driving connection of the screw part of the fastener for rotating the same, and power means for rotating the driving member.

11. In a tool for setting or driving a blind fastener comprising an externally threaded screw part having a driving connection located at an accessible side of a nut part threaded onto said screw part, a housing having a forwardly extending part the end of which is engageable with the accessible end of the nut part and has an aperture a portion of which is provided with internal threads engageable with a threaded portion of the screw part of the fastener and through which internally threaded portion the screw part of the fastener is adapted to project, a driving member rotatable within said housing for rotating the screw part of the fastener relative to the nut part engageable with the driving connection of the screw part of the fastener and permitting movement thereof relative to said housing, and power means for rotating the driving member relative to said housing.

References Cited
UNITED STATES PATENTS

| | | | |
|---|---|---|---|
| 1,009,248 | 2/1911 | Jenkins | 81—53 |
| 1,362,697 | 12/1920 | Herman | 81—56 |
| 2,282,711 | 5/1942 | Eklund | 85—73 |
| 2,382,170 | 8/1945 | Phillips | 81—53 |
| 2,385,126 | 9/1945 | Benton | 85—73 |
| 2,428,165 | 9/1947 | Ketchum | 72—391 |
| 3,078,002 | 2/1963 | Rodgers | 85—73 |
| 3,128,655 | 4/1964 | Keasler | 81—55 |
| 3,197,987 | 8/1965 | Martin | 85—70 |
| 3,222,977 | 12/1965 | Vaughn | 85—72 |

FOREIGN PATENTS 647,380  12/1950  Great Britain.

EDWARD C. ALLEN, *Primary Examiner.*

MARION PARSONS, JR., CARL W. TOMLIN,
*Examiners.*